INVENTORS
WARREN H. COWLES
BY JOHN E. SMITH
ATTORNEYS

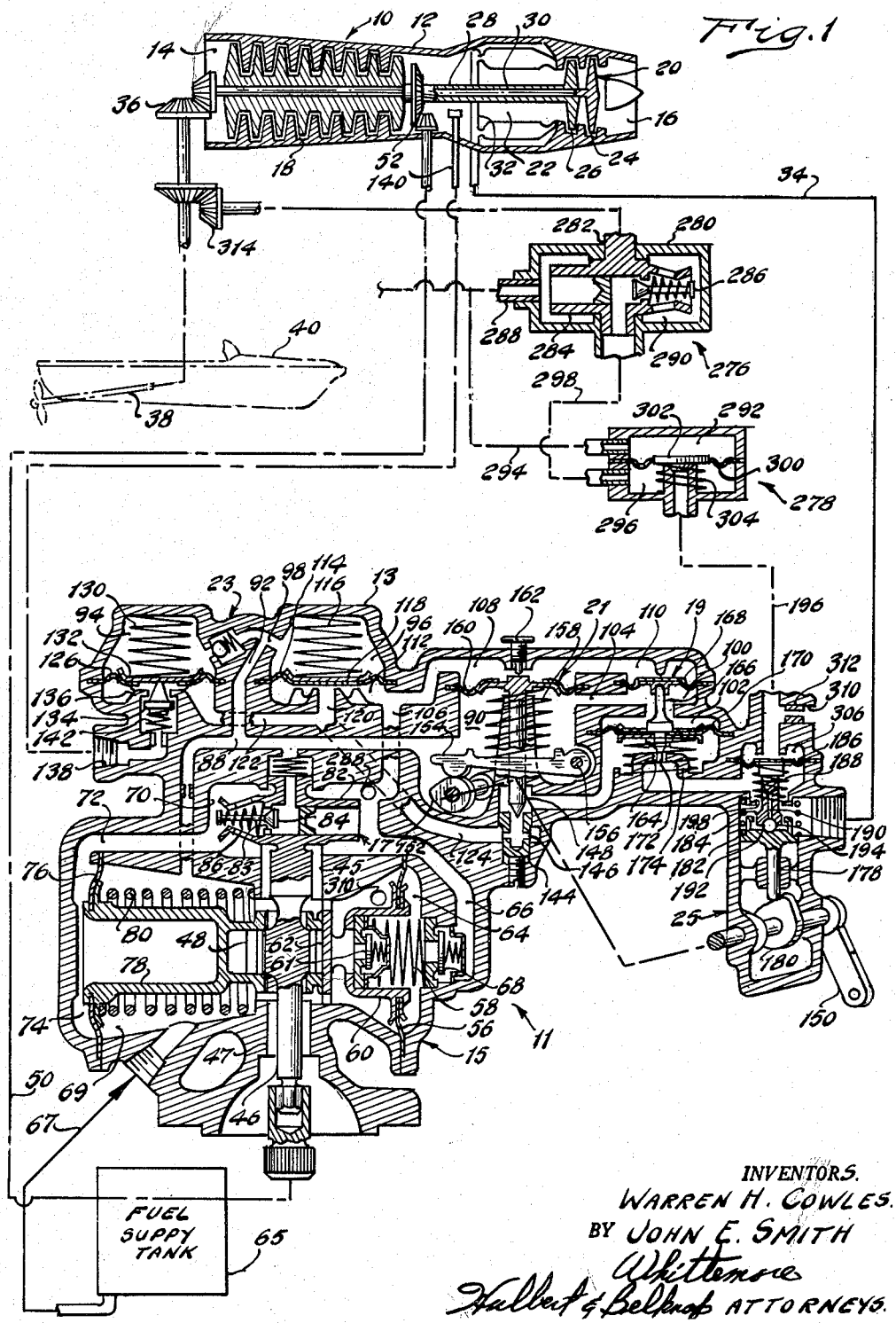

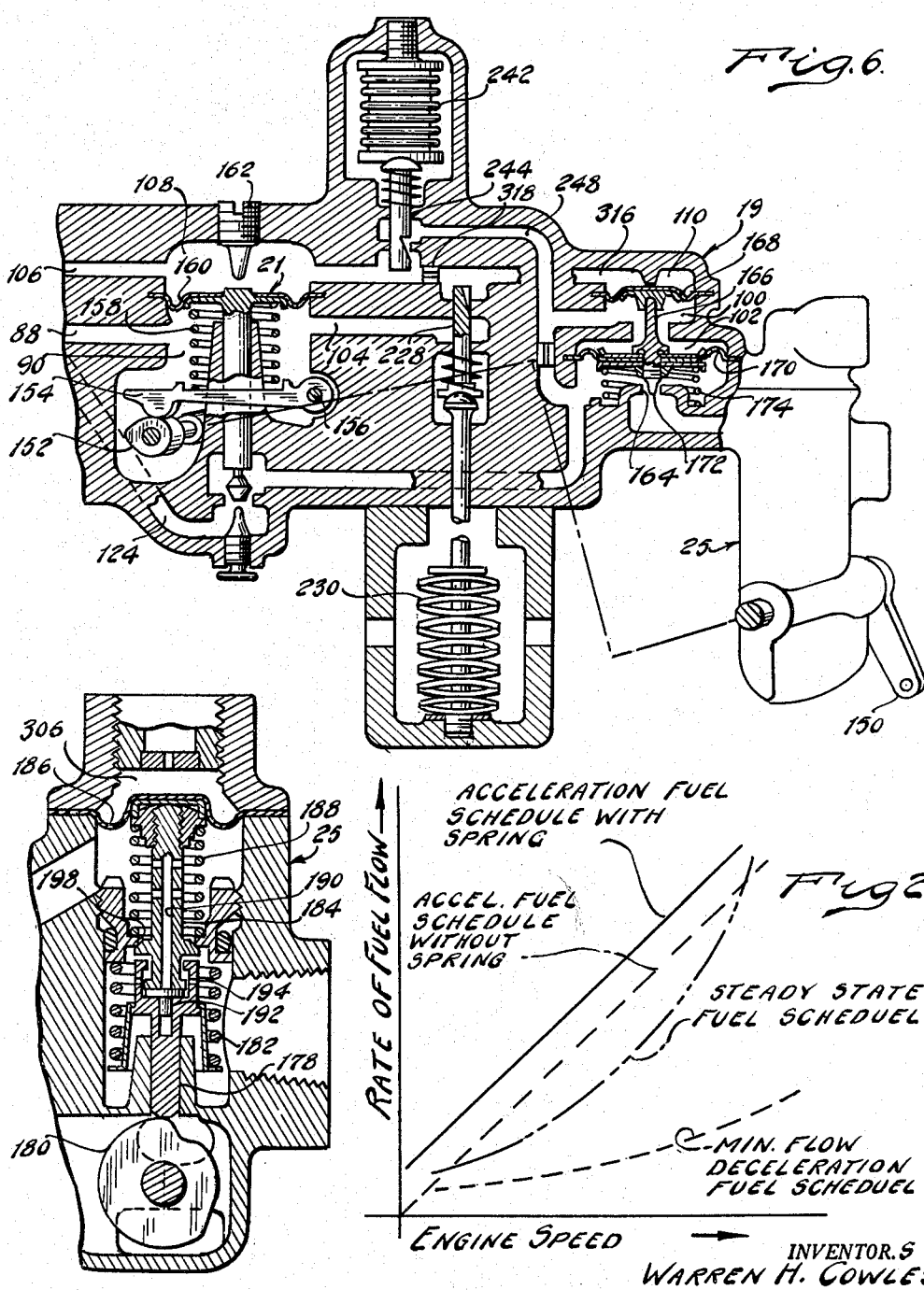

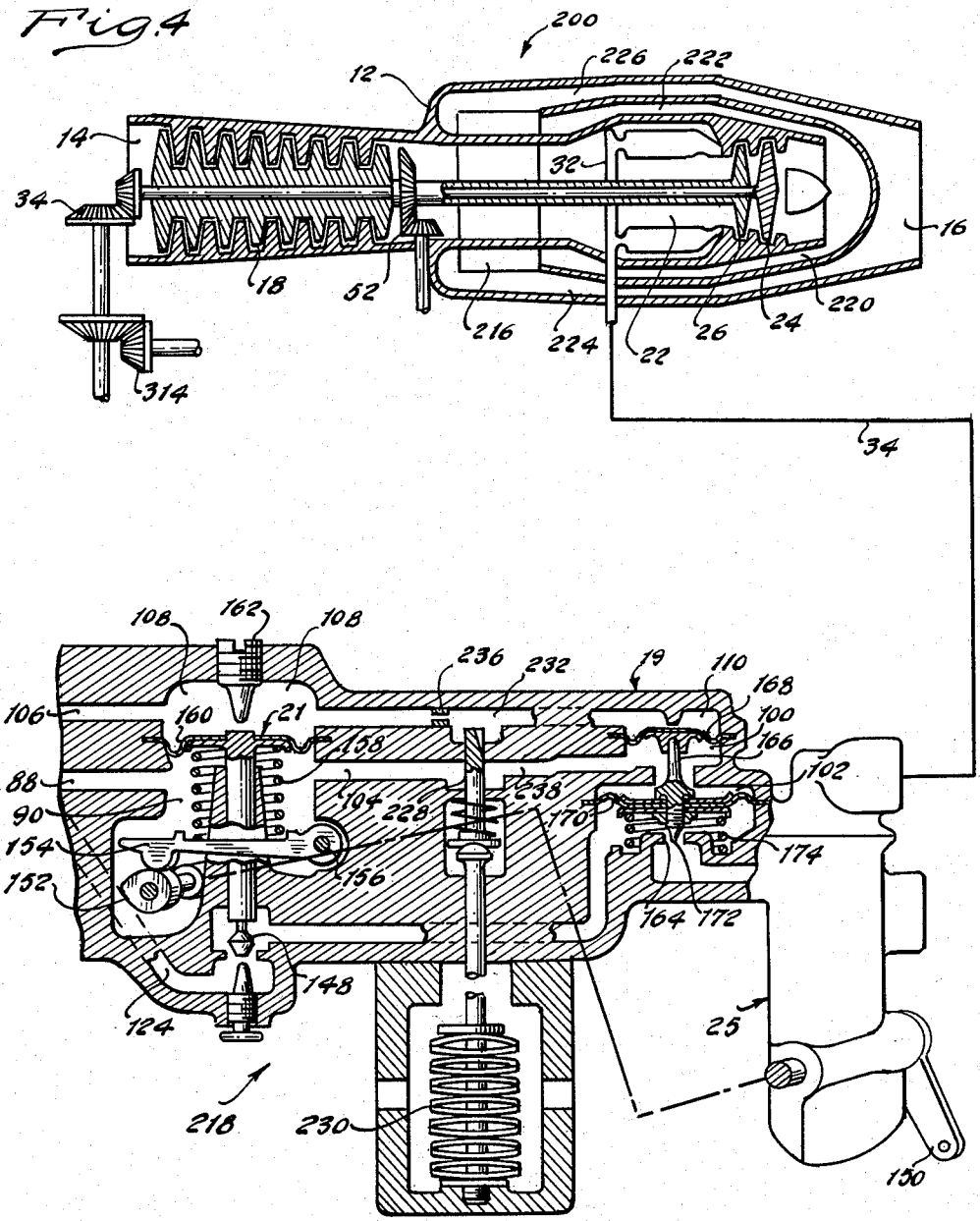

May 18, 1965 W. H. COWLES ETAL 3,183,957
TURBINE ENGINE FUEL CONTROL
Filed Oct. 9, 1961 5 Sheets-Sheet 5

INVENTORS.
WARREN H. COWLES
BY JOHN E. SMITH
Whittemore
Hulbert & Belknap ATTORNEYS.

United States Patent Office 3,183,957
Patented May 18, 1965

3,183,957
TURBINE ENGINE FUEL CONTROL
Warren H. Cowles, Birmingham, and John E. Smith, Rochester, Mich., assignors to Holley Carburetor Company, Warren, Mich., a corporation of Michigan
Filed Oct. 9, 1961, Ser. No. 143,880
6 Claims. (Cl. 158—36.4)

The invention relates to fuel controls and refers more specifically to improved means for metering fuel to a turbine engine or similar device in accordance with the speed thereof at speeds below governed speed including means for providing igniter fuel at predetermined speeds, adjustable speed governing means and emergency fuel cut-off means.

Fuel metering apparatus for turbine engines and the like have in the past been relatively complicated and therefore have been expensive to manufacture and maintain. Further, the fuel metering devices of the past have not been as reliable as desirable due to their complicated structure and they have been too heavy for many uses. Where uncomplicated, light relatively inexpensive fuel controls have been provided. In the past they have lacked the requisite versatility required of turbine engine fuel controls.

It is therefore one of the objects of the present invention to provide a lighter, more versatile control for metering a substance to a device with which the control is associated at a rate proportional to a parameter of the device below a predetermined value of the parameter.

Another object is to provide an improved fuel control operable to meter fuel to a turbine engine or similar device with which it is associated in accordance with the speed of the device below a predetermined speed.

Another object is to provide an engine fuel control as set forth above and further including means operably associated therewith for metering igniter fuel to the turbine engine between predetermined speeds thereof.

Another object is to provide an engine fuel control as set forth above and further including means operably associated therewith for governing the speed of the engine at a predetermined speed.

Another object is to provide an engine fuel control as set forth above and further including an emergency shut-off valve operably associated therewith to reduce the fuel metered to the turbine engine to a minimum during periods of turbine over-speed.

More specifically it is an object to provide a turbine engine fuel control as set forth above including a constant pressure pump associated with a speed sensor operable to produce a pressure differential which is a function of engine turbine speed and a diaphragm actuated throttle valve responsive to predetermined fuel pressures developed by the pump and speed sensor for metering a quantity of fuel to the turbine engine substantially linearly proportional to engine speed.

Another object is to provide a fuel control as set forth above including governing means comprising a spring biased diaphragm actuated governor valve responsive to the pressure differential developed by the pump and speed sensor to limit the fuel metered to the turbine engine at gas producer turbine speeds below a predetermined value.

Another object is to provide a fuel control as set forth above including means for automatically starting the engine at a given speed by metering igniter fuel thereto comprising a pair of diaphragm actuated metering valves connected in series and actuated by the pressure differential developed by the pump and speed sensor to provide a fuel metering passage between the pump and turbine engine igniter between predetermined gas producer turbine engine speeds.

Another object is to provide a fuel control as set forth above including an emergency shut-off valve comprising valve means for metering fuel to the engine at speeds below a predetermined power turbine speed through a first valve passage and including means responsive to power turbine over-speed operable to close the first valve passage and to open a restricted passage through the valve whereby on power turbine speed becoming greater than desirable the fuel fed to the turbine engine is reduced to a minimum required to prevent flame-out.

Another object is to provide a turbine engine fuel control as set forth above including means for compensating for the effect of a regenerator used with the turbine engine comprising a regenerator compensating valve operable to control the pressures applied to the throttle valve of the fuel control which regenerator valve is actuated by a temperature responsive bi-metallic disc assembly.

Another object is to provide a turbine engine fuel control as set forth above including means for controlling the quantity of fuel metered to the turbine engine in accordance with the altitude at which the engine is operating comprising an altitude compensating valve operable to control the pressures applied to the throttle valve of the fuel control which altitude compensating valve is actuated by a pressure responsive bellows.

Another object is to provide a fuel control for a turbine engine as set forth above wherein means are provided to compensate for the effects of both a regenerator used with the turbine engine and for the effects of different altitudes on the fuel requirements of the engine.

Another object is to provide an engine fuel control as set forth above which further includes diaphragm actuated pressure responsive governor valve reset apparatus operable to aid in resetting the governor valve at governed speed.

Another object is to provide an engine fuel control as set forth above which further includes a diaphragm actuated constant pressure valve in the igniter fuel metering means to insure that fuel delivered to the igniter of the turbine engine is at a predetermined pressure without regard to the means pumping the fuel.

Another object is to provide a fuel control for a turbine engine or similar device which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a diagrammatic representation of a fuel control for a turbine engine constructed in accordance with the invention.

FIGURE 2 is a graph of engine speed against rate of fuel flow illustrating the fuel flow through the fuel control of FIGURE 1 and the effect of resiliently biasing the throttle valve thereof.

FIGURE 3 is an enlarged diagrammatic representation of the emergency shut-off valve illustrated in FIGURE 1.

FIGURE 4 illustrates a modification of the fuel control illustrated in FIGURE 1 including means for compensating for the effect on fuel requirements of a regenerator in conjunction with the turbine engine.

FIGURE 6 illustrates another modification of the fuel control illustrated in FIGURE 1 wherein the means for compensating for a regenerator used with the turbine engine and for the effect of altitude on the fuel requirements of the turbine engine are both included in the fuel control.

Figure 5:
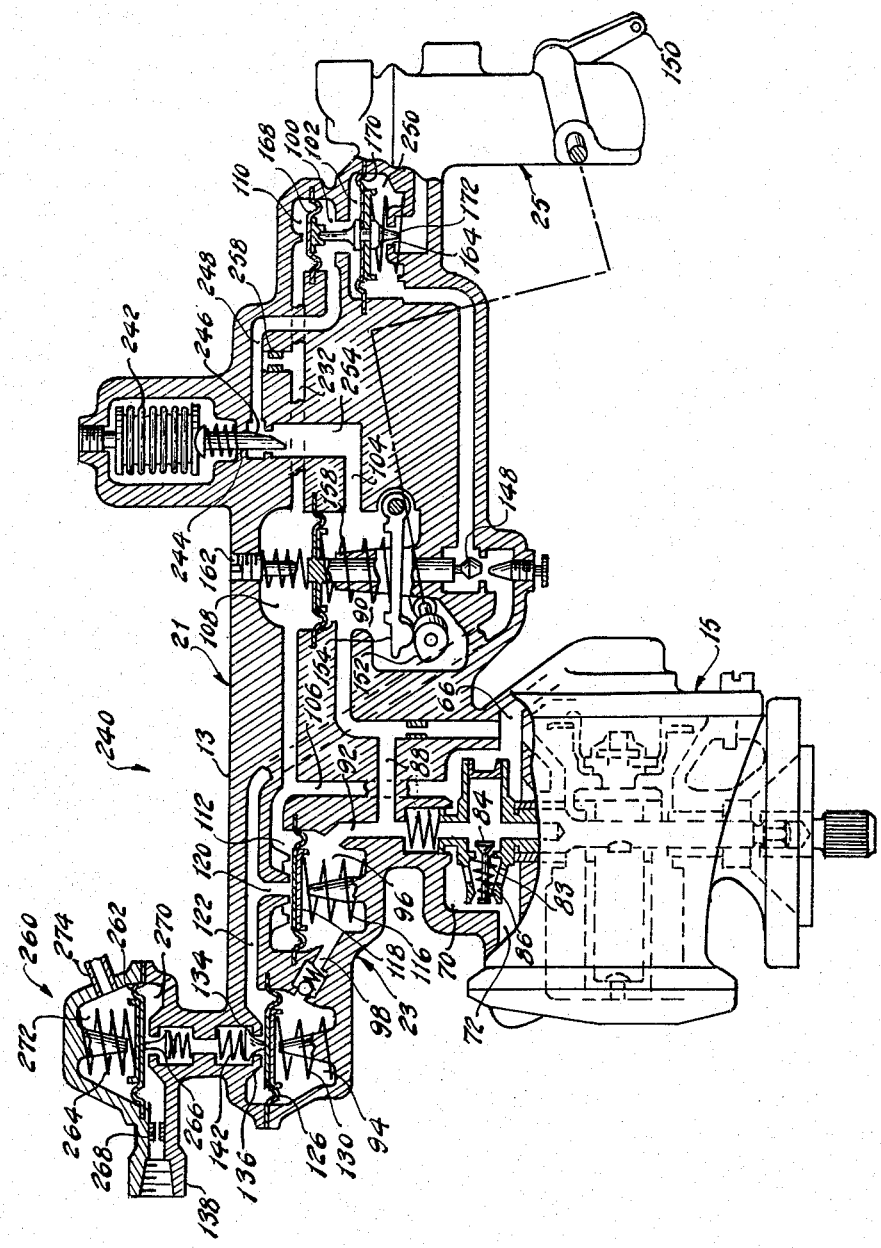
FIGURE 5 illustrates a modification of the fuel control illustrated in FIGURE 1 including means for compensating for the effect of altitude on the fuel requirements of the turbine engine to which fuel is being metered.

With particular reference to the drawings a specific embodiment of the present invention will now be disclosed.

In accordance with the invention the turbine engine 10 is provided with a fuel control 11 contained within a housing 13. The fuel control 11 comprises the constant pressure pump 15, the speed sensor 17, a fuel metering throttle valve 19, governor valve 21, igniter fuel metering means 23 and emergency shut-off valve 25.

In operation the pump 15 and the speed sensor 17 provide a pressure differential proportional to the square of the speed of the gas producer turbine 26 of the engine 10. In addition the throttle valve 19 produces a further pressure intermediate of the pressures produced by the pump 15 and speed sensor 17 by throttling the orifice 164. Acceleration fuel flow through a constant area orifice formed during acceleration by valve seat 144 and needle valve 148 is controlled by the further pressure and the pump pressure in accordance with engine requirements at engine speeds below governed speed.

At a predetermined governed speed the governor valve 21 functions to limit the fuel metered to the engine to a predetermined variable minimum amount as indicated by the steady state fuel schedule of FIGURE 2. At power turbine speeds above a predetermined speed the emergency shut-off valve 25 limits the fuel metered to the turbine engine to the amount necessary to prevent engine flame-out, thus preventing power turbine overspeed. The igniter fuel metering means is operable in response to the pressures developed by the pump 15 and speed sensor 17 to meter fuel to the turbine engine over a predetermined speed range below governed speed.

Thus with the fuel control of the invention compact, relatively uncomplicated, highly efficient, versatile means for controlling the fuel metered to a turbine engine in accordance with predetermined requirements thereof are provided.

More specifically, the turbine engine 10 illustrated in FIGURE 1 includes a housing 12 with an air inlet 14 and an exhaust 16 and containing a compressor 18 and turbine assembly 20 with a burner chamber 22 therebetween. The turbine assembly is comprised basically of a power turbine 24 and a gas producer turbine 26. The power turbine 24 drives the output shaft 30 while the gas producer turbine 26 drives the compressor 18 by means of a hollow shaft 28. A fuel burner ring 32 delivers metered fuel to the burner section as by means of a conduit 34. The output shaft 30, connected as by any suitable gear box 36 to the propeller shaft 38, is schematically illustrated as being located in a boat 40.

The pump 15 located within housing 13 of fuel control 11 comprises a shaft 46 rotatably mounted in bearings 45 and 47 which shaft has an eccentric 48 mounted thereon for rotation therewith. The shaft 46 is rotated as by means of any suitable transmission 50 in accordance with compressor speed as by the gear box 52. Pump 15 also includes the diaphragm 56 biased to the left by spring 58 and secured to the cup-like member 60 as shown in FIGURE 1. Cup 60 has a check valve 61 therein and an abutment surface 62 which at times comes into contact with the eccentric 48.

As the shaft 46 is rotated, eccentric 48 rotates therewith and causes the cup-like member 60 and diaphragm 56 to move to the right in FIGURE 1 by contacting surface 62 of cup 60. As the cup 60 so moves the fuel contained in chamber 64 is forced into conduit 66. Reverse flow is prevented by means of a second check valve assembly 68. On movement of the cup-like portion 60 to the left in FIGURE 1 under bias of spring 58 on further rotation of eccentric 48 fuel is drawn into chamber 64 from fuel supply tank 65 through conduit 67 and chamber 69.

Fuel from conduit 66 at a relatively high pressure $P_1$ enters chamber 70 from where it flows by means of conduit 72 into a chamber 74 defined generally by a diaphragm member 76 in cooperation with the housing 13. A second cup-like member 78 is secured to the diaphragm 76 and is continually urged to the left by means of spring 80. The cup-like member 78 and diaphragm 76 act as a hydraulic accumulator in order to maintain a relatively constant $P_1$ pressure by varying the pumping capacity of diaphragm 56 and member 60 in accordance with fuel requirements.

That is, if pressure $P_1$ should tend to increase, the increase in pressure immediately causes the diaphragm 76 and member 78 to move to the right thereby pushing surface 62 some distance to the right with it. Consequently, as shaft 46 continues to rotate the eccentric 48 will still move surface 62 to the same extreme right position in FIGURE 1, but member 60 will not be allowed to return to the same left-most position as it had previously occupied. This in effect shortens the pumping stroke which in turn reduces the volume displaced and, since pump 15 is of the positive displacement type, further increase in pressure is prevented.

Speed sensor 17 includes a cross member 82 secured to the end of shaft 46 for rotation therewith and containing a valve 84 continually biased to the left in FIGURE 1 as by means of a spring 86. At low speeds the fuel in chamber 70 flows relatively unrestricted through the orifice 83 controlled by valve 84; however, in so doing a pressure drop is created which causes a differential of $P_1$ to $P_2$ which is used as an indication of engine speed. As the speed of rotation of shaft 46 increases, the centrifugal force on valve 84 also increases thereby further restricting the flow of fuel through the previously mentioned orifice. Accordingly, it can be seen that as engine speed increases so does the differential of pressure $P_1$ to $P_2$ and this differential varies as the square of the engine speed.

Fuel at a pressure of $P_2$ is admitted into a conduit 88 from where it flows into chamber 90, conduit 92 and into chambers 94 and 96, by means of a conduit portion 98 and into chambers 100 and 102 by means of a conduit portion 104. Fuel at a pressure of $P_1$ flows from chamber 70 into conduit 106 from where it flows into chambers 108 and 110 and also to chamber 112.

The igniter fuel metering means 23 includes diaphragm 114 which is continually urged downwardly by means of spring 116 and which has a valving member 118 associated therewith for closing the orifice leading to conduit portion 120. As the engine is being cranked during starting the valve member 118 maintains the orifice of conduit 120 closed until the engine is revolving at approximately 10% of maximum speed. When the engine does attain the 10% speed, the pressure $P_1$ is sufficiently high relative to pressure $P_2$ to move the valving member 118 upwardly thereby allowing the fuel at a pressure $P_1$ to flow from conduit 120 to conduits 122 and 124.

A separate diaphragm member 126 also biased downwardly by a spring 130 has an abutment member 132 associated therewith which causes the valve member 134 to open its orifices whenever the diaphragm and member 132 are in their lowermost position as determined by the spaced projections 136. Once fuel at $P_1$ is permitted to flow through conduit 122, it then flows through the projections 136, the orifice controlled by valve 134 and into conduit 138 which leads to the igniter schematically illustrated at 140. Fuel continues to flow through conduit 138 until the engine reaches approximately 40% speed at which time pressure $P_1$ will have increased sufficiently relative to $P_2$ so as to move diaphragm 126 and member 132 upwardly thereby allowing spring 142 to move valve 134 upwardly closing its coacting orifice halting the flow of fuel to the igniter 140. Thus fuel is metered to the igniter by controlling the pressure of fuel fed to igniters of known nozzle area during engine speeds of from 10 to 40% of maximum speed.

The governor valve 21 includes an adjustable valve seat assembly 144 having a plurality of radially formed ports 146 therein which valve seat assembly is adapted to coact with the needle valve 148 for metering the fuel flowing through conduit 124 into the burner ring 32. For example, when the power selector lever 150 is manually rotated to a position of increased engine speed or power, cam 152 is rotated so as to vary the position of lever arm 154 by rotating it clockwise about its coacting pivot 156. When lever arm 154 is so rotated spring 158 is compressed thereby causing the needle valve 148 and diaphragm 160 to move upwardly to the maximum position determined by an adjustable stop 162. Accordingly, during this time as the needle valve 148 is maintained in its relatively wide-open position an increased fuel flow is experienced through the valve seat assembly 144 thereby causing engine acceleration.

It is to be noted that opposite sides of diaphragm 160 are exposed to pressures $P_1$ and $P_2$, the differential between these pressures being an indication of engine speed. Therefore, when governed engine speed is attained the pressure differential causes the diaphragm 160 and needle valve 148 to once more move downwardly against the resisting force of spring 158 so as to some degree close off the metering orifice in the seat assembly 144 to limit the fuel flow therethrough to that necessary to maintain the engine 10 at governed speed.

The fuel metering throttle valve 19 includes an orifice 164, located downstream of the seat assembly 144 which is controlled by a valve assembly comprised of a valve body portion 166 and diaphragms 168 and 170 secured thereto. The inner surfaces of the respective diaphragms 168 and 170 are exposed to the pressure $P_2$ while the outer surface of diaphragm 168 is exposed to $P_1$ pressure and the outer surface of diaphragm 170 is exposed to a $P_3$ pressure which is greater than pressure $P_2$ but less than pressure $P_1$. In the particular embodiment of the invention illustrated in FIGURE 1, the diaphragms 168 and 170 are so proportioned as to have the effective area of diaphragm 168 equal to half that of diaphragm 170.

In operation, during periods of acceleration, when the needle valve 148 is maintained in its uppermost position the fuel flow schedule to the engine 10 through the constant area defined by the valve 148 and valve seat assembly 144 is determined by the pressure $P_3$. Pressure $P_3$ is controlled by the valving portion 172 of the throttle valve 19 which is connected to the body portion 166 in conjunction with orifice 164. The coaction of orifice 164 and the valving portion 172 is regulated by a balance of pressures $P_1$ and $P_3$ acting on diaphragms 168 and 170. Further the fuel flow through the constant area orifice formed by the governor valve during acceleration is a function of the pressure drop thereacross.

In the embodiment of the invention illustrated in FIGURE 1 because of the respective areas of diaphragms 168 and 170 the pressure differential of $P_1$ to $P_3$ is maintained as 50% of the pressure differential of $P_1$ to $P_2$. Therefore, as engine speed increases, diaphragm 168 tends to move valve portion 172 downwardly. However, at the same time pressure $P_3$ is increasing due to the downward movement of valve portion 172 thereby regulating the distance diaphragm 168 moves the valve portion 172. Any variation in pressure $P_1$ or $P_3$ will of course move the valve portion 172 until the previously mentioned 50% ration is again attained due to opening or closing of orifice 164 and the consequent change in pressure $P_3$.

During periods of acceleration it will be noted that even though pressure $P_1$ is maintained relatively constant that pressures $P_3$ and $P_2$ are actually decreasing due to the rotation of speed sensor 17 and the differential areas of diaphragms 168 and 170. Therefore, since the orifice defined by valve seat assembly 144 and needle valve 148 is constant the fuel flow therethrough will increase since the pressure differential of $P_1$ to $P_3$ is increasing. Accordingly, the fuel flow during periods of acceleration is increasing as a straight line function proportional to engine speed as indicated in FIGURE 2. Spring 174 which is illustrated as biasing diaphragm 170 actually shifts the entire engine speed, rate of fuel flow curve upwardly as illustrated in the graph of FIGURE 2.

Downstream of the throttle valve 19 is an emergency shut-off valve assembly. In addition to the function of shutting off the engine when the operator desires, the valve assembly 25 responds to power turbine overspeed by shutting off the metered fuel flow and permitting only a minimum flow sufficient only to prevent engine flame-out. The shut-off valve assembly, illustrated in FIGURE 1, is comprised of a cam follower portion 178 slidably received within the housing 13 and biased downwardly against the cam 180 by means of a spring 182. The enlarged view of the shut-off valve assembly 25, shown in FIGURE 3, is substantially the same in structure and operation as the shut-off valve assembly illustrated in FIGURE 1.

The body portion of member 178 is adapted to slidably receive one end of a second member 184 therein. The second member 184 has at its other end a diaphragm 186 and is biased upwardly by a spring 188. A ball valve member 192 located between members 178 and 184 is adapted to at times restrict the flow through conduit passage 190 formed in member 184. Member 178 also has a plurality of radially formed passages 194 formed therein which communicate between the discharge conduit 34 and the space defined between members 178 and 184 when passage 190 is open. Conduit 196 is connected to a source of relatively high pressure so as to continually bias the diaphragm 186 and body 184 downwardly against the action of spring 188 thereby seating the valve 192 and fully opening the valve orifice 198. It will be understood that the T valve illustrated in FIGURE 3 can be used in place of the ball valve illustrated in FIGURE 1 with equally sufficient results.

If, for example, the pressure in conduit 196 should drop which it will when the power turbine overspeeds, spring 188 will move diaphragm 186 and member 184 upwardly closing orifice 198. However, at the same time the ball valve 192 is released and minmum flow is permitted through conduit passage 190 and the radially formed passages 194 so as to maintain minimum fuel requirements to the engine.

When it is desired to shut down the turbine engine 10 by cutting off all fuel to the engine the cam 180 is rotated to move the cam follower 178 upward in FIGURES 1 and 3 in opposition to the spring 182. The valve 192 will thus close the minimum fuel requirement passage 190. Further rotation of the cam 180 will produce upward movement of the valve member 184 and diaphragm 186 in opposition to the pressure in chamber 306 until the valve orifice 198 is cut off at this time to shut down the engine.

Various means may be employed for creating a pressure signal at diaphragm 186. The speed sensor 276 and diaphragm valve assembly 278 comprise but one embodiment of such a means. Speed sensor 276 is comprised generally of a stationary outer housing 280 containing a shaft 282 with a cross member 284 formed thereon for rotation within the housing 280. A spring biased valve member 286 more nearly closes off its cooperating orifice as the rotational speed of shaft 282 increases. Conduit 288 which communicates with chamber 70 directs fuel at a pressure $P_1$ to chamber 290 of housing 280.

Fuel at a pressure $P_1$ is also communicated to chamber 292 as by means of conduit 294. The speed sensor pressure is communicated to chamber 296 by means of conduit 298. A diaphragm 300 having a valve element 302 associated therewith is urged upwardly by the spring 304 located in chamber 296. Chamber 296 is in communication with chamber 306 by means of conduit 196 during all periods of engine operation other than power turbine overspeed. Conduit 310 containing a restriction 312 therein is in communication with the low return pressure of chamber 69.

The power turbine 24 will overspeed whenever the propeller of boat 40 comes out of the water. Such overspeed is in many cases detrimental and the only way to prevent such overspeed is to reduce the metered fuel flow of the burner chamber 22. Accordingly, as the power turbine overspeeds, the change in speed is sensed by shaft 282, as by means of gear box 314, causing the valve 286 to more nearly close its cooperating orifice. Consequently, the pressure in chamber 296 drops and diaphragm 300 and valve element 302 are moved downwardly against the force of spring 304. When valve element 302 seats, all flow is terminated through conduit 196 and consequently, the pressure in chamber 306 is almost instantaneously reduced. As the pressure in chamber 306 so decreases spring 188 urges the diaphragm 186 and valve member 184 upwardly thereby closing off orifice 198. At the same time chack valve 192 is released and minimum flow is permitted through conduit 190 and radially formed passages 194. Such fuel flow is, however, only sufficient to maintain engine idle. If it is desired to cut off all fuel on the overspeed passage 190 is not provided.

Thus in accordance with the invention there is provided a fuel control 11 for a turbine engine 10 or similar device which is relatively compact and which is reliable due to its simplicity. Further with the fuel control as described above versatility of control has not been sacrificed for reliability and simplicity.

FIGURE 4 illustrates a modification of the fuel control of the invention shown in FIGURE 1 as employed with a turbine engine having a regenerator associated therewith. The turbine engine 10 of FIGURE 4 is similiar to turbine engine 10 illustrated in FIGURE 1 and similar reference characters are therefore used to designate similar elements. In addition heat exchangers 216 are located between the discharge of the compressor 18 and the burner chamber 22. Fuel supply conduit 34 is connected to the fuel control 218 in the same way as illustrated in FIGURE 1. The fuel control 218 is identical to the fuel control 11 of FIGURE 1 in all respects except as specifically noted to the contrary. All elements of the fuel control 218 which are like or similar in shape or function to the elements of fuel control 11 are also identified with like reference numbers.

The general theory behind the regenerator is to use the heat of the turbine exhaust gases by diverting them through a heat exchanger before discharging such gases to the atmosphere. The heat exchanger also receives air as discharged by the compressor, which passing through the heat exchanger, absorbs a significant amount of heat and expands to some degree because of it. Consequently, since the power developed by a turbine engine is based on the expansion of gases a lesser amount of fuel is required to obtain the same amount of power because a portion of the heating has been achieved by using the exhaust gases. Accordingly, the turbine engine 200 illustrated schematically in FIGURE 4 includes duct work which provides passages 220 and 222 for delivering the exhaust gases to the heat exchanger 216. After the exhaust gases have passed through the respective heat exchangers they are in turn exhausted to the atmosphere as by means of ducts 224 and 226.

Since a lesser amount of fuel is required due to heating of the compressor air in the heat exchanger 216 provision must of course be made within the fuel control for altering the rate of metered fuel flow in accordance with the degree to which the compressor discharge air has been preheated. The fuel control 218 illustrates such a modification of the fuel control 11 for so altering the fuel flow wherein a spring biased valve 228 is made to move in accordance with the temperature of the preheated compressor discharged air. This is accomplished by providing, for example, a temperature responsive bi-metallic disc assembly 230 past which is directed a portion of the preheated compressor discharge air so as to cause expansion of the disc assembly and thereby move valve 228 upwardly. The bi-metallic disc assembly 230 may actually be placed within the path of compressor discharge air flow through exchanger 216, or, in the alternative a small portion of that air flow may be diverted by suitable conduitry past the bi-metallic disc assembly 230.

Conduit 232 which communicates between the chambers 108 and 110 has a restriction 236 therein. An orifice adapted to receive the valve member 228 therein communicates between conduit 232 and conduit 238 at a point between restriction 236 and chamber 110.

During periods of initial engine operation prior to any significant change in temperature, the compressor-discharge-air temperature sensing bi-metallic disc assembly 230 would be in its most contracted position causing valve 228 to fully open its cooperating orifice thereby reducing the pressure in chamber 110 to some value approaching pressure $P_2$. This is of course achieved by the use of the fixed restriction 236 and valve 228 which by means of its cooperating orifice acts as a variable restriction. As the preheat of compressor discharge air increases bi-metallic disc assembly will be to some degree expanded causing valve 228 to move upwardly thereby closing the communication, through its coacting orifice, as between conduits 232 and 238.

At this time the pressure in chamber 110 is increasing toward ultimate limit thereof which is of course pressure $P_1$. As a result of this, in order for the throttle valve 19 to still maintain equilibrium the valve portion 172 will more nearly close off orifice 164 so as to increase the pressure $P_3$ in order to offset the increase in the pressure of chamber 110. As the pressure $P_3$ increases the differential of pressures $P_1$ to $P_3$ diminishes; consequently, the flow through the orifice defined by valve 148 is reduced since the flow therethrough is a function of the effective area and pressure differential.

FIGURE 5 illustrates a second modification of the invention as would possibly be used with an aircraft turbine engine. For such purposes the engine illustrated in FIGURE 1 can be considered as having its output shaft connected, for example, to a propeller or the engine may be considered a straight through jet type turbine engine having no output shaft. In either case, the fuel control 240 is identical to the fuel control illustrated in FIGURE 1 in all respects except where noted specifically to the contrary. As previously, all elements which are like or similar in function are labeled with like reference numerals.

The modification of FIGURE 5 contemplates the provision of means for varying the metered fuel flow in accordance with altitude. This is accomplished, for example, by providing an evacuated bellows assembly 242 which controls valve member 244 cooperating with an orifice 246 which communicates between conduit 248 and 254; conduit 254 being in communication with chamber 90. A conduit portion having a restriction 258 therein communicates between conduits 232 and 248.

Accordingly, the chamber 110 is at some relatively constant pressure $P_1$ while chamber 250 is at a pressure $P_3$ and chambers 100 and 102 are at some variable pressure $P_4$ determined by the position of valve 244 with respect to orifice 246.

As in all fuel control systems where altitude compensation is required for varying the metered fuel flow, it is known that, generally speaking, the rate of metered fuel flow has to be reduced in accordance with increases in altitude since the air density is continually diminishing.

In this modification, as the aircraft increases altitude, bellows 242 will expand causing valve 244 to more nearly close orifice 246. As the orifice is so closed, pressure $P_4$ within conduit 248 and chambers 100 and 102 increases in value with pressure $P_1$ being the theoretical maximum value.

As was previously stated, the throttle valve 19 is one which maintains the pressure differential between chambers 102 and 250 equal to approximately half that between chambers 100 and 110. Accordingly, since pressure $P_4$ has increased, the pressure differential across diaphragms 168 and 170 has been lessened by equal amounts instead of proportionally. Therefore, in order to once more attain the relationship of the pressure differentials, pressure $P_3$ must increase. This of course is achieved by having the respective diaphragms 168 and 170 and valve member 172 moved downwardly thereby more nearly closing off orifice 164.

The diaphragms and valve member will move downwardly until the previously mentioned pressure ratios are achieved. At this time, pressure $P_3$ will have increased. However, since pressure $P_1$ is a constant pressure, the pressure differential across valve 148 will be diminished. Therefore, with a metering orifice of constant area, as metering valve 148 may be considered to be, metered fuel flow therethrough is diminished because of the decrease in pressure differential between pressures $P_1$ and $P_3$.

Another modification of fuel control 11 which is also illustrated by FIGURE 5 is the provision of valve assembly 260 which contains a diaphragm 262 biased downwardly by a spring 264 so as to keep valve member 266 off its coacting seat. A restriction 268 is in discharge conduit 138 communicating with chamber 270. Chamber 272 is continually vented to the atmosphere as by means of a conduit portion 274.

In certain aircraft installations the fuel control may be required to operate in combination with a second pump which delivers fuel at a much higher pressure. Since the igniter 140 has its respective nozzles calibrated to deliver a particular rate of fuel flow for a particular pressure differential, any substantial increase in pressure differential would result in an over-abundance of fuel flow and could conceivably produce a fuel-air ratio which is not ignitable or in the alternative, create hot-spots within the engine.

Assuming that a second pump were so provided and that this second pump caused pressure $P_1$ to be increased for example 50 p.s.i., the valve 266 and its cooperating orifice would reduce pressure $P_1$ so as to be equal to that without the second pump and be some lower value, say 30 p.s.i., in chamber 270 as required. For example, if fuel at some higher pressure flowed into chamber 270 diaphragm 262 would be urged upwardly against the force of spring 264 thereby allowing valve 266 to more nearly close off its cooperating orifice. As valve 266 moved in such a direction, the orifice would be decreased in area thereby causing a greater restriction to flow and consequently reduce the pressure in chamber 270 until the desired pressure was attained.

FIGURE 6 illustrates another possible modification of fuel control 11 wherein means for varying the rate of metered fuel flow, in accordance with both altitude and regenerator temperature, are provided. The over-all fuel control may of course, be identical to that disclosed by FIGURE 5 except where noted to the contrary. All elements which are like or similar in function to those illustrated by FIGURES 1, 4 and 5 are labeled with like reference numbers.

Conduit 316 which communicates generally between chambers 108 and 110 has branch conduit portions formed by valve members 244 and 228 and their respective cooperating orifices. A restriction 318 is also contained within conduit 316 at a point between valves 244 and 228.

From the discussion of FIGURES 4 and 5, it is apparent that fuel flow must be decreased whenever the regenerator temperature increases and whenever the engine is operating at higher altitudes. Accordingly, the modification illustrated by FIGURE 6 contemplates the provision of means for varying the fuel flow in accordance with both these two parameters.

Pressure $P_4$ in chamber 110 is a function of the position of valve 228 as determined by the regenerator temperature sensing bellows 230, while pressure $P_5$ in conduit 248 and chambers 100 and 102 is determined by valve 244 as positioned by bellows 242.

Even though regenerator temperature may be low, there is still a substantial pressure differential existing between pressures $P_4$ and $P_2$ with pressure $P_4$ being greater. The same applies to pressures $P_5$ and $P_3$ during low altitude operation. That is, even though bellows 242 may be compressed, there is still some substantial flow past valve 244 so as to maintain pressure $P_5$ greater than pressure $P_3$.

In order to better describe the operation, let it be assumed that regenerator temperature is low thereby causing valve 228 to be in its most wide open position. As the engine increases in altitude, valve 244 will be moved to a more wide-open position thereby increasing pressure $P_5$ in chambers 100 and 102. Consequently, the valving portion 172 of the throttle valve 19 will move downwardly until pressure $P_3$ increases sufficiently to once more create equilibrium. An increase in pressure $P_3$, as previously discussed, in turn reduces the rate of metered fuel flow past valve 148.

Additionally, as regenerator temperature increases valve 228 will be forced upwardly thereby increasing pressure $P_4$. Again, the valving portion 172 of the throttle valve 19 will move downwardly until pressure $P_3$ increases sufficiently so as to offset the increase in pressure $P_4$ and thereby further reduce the rate of metered fuel flow.

Figure 7:
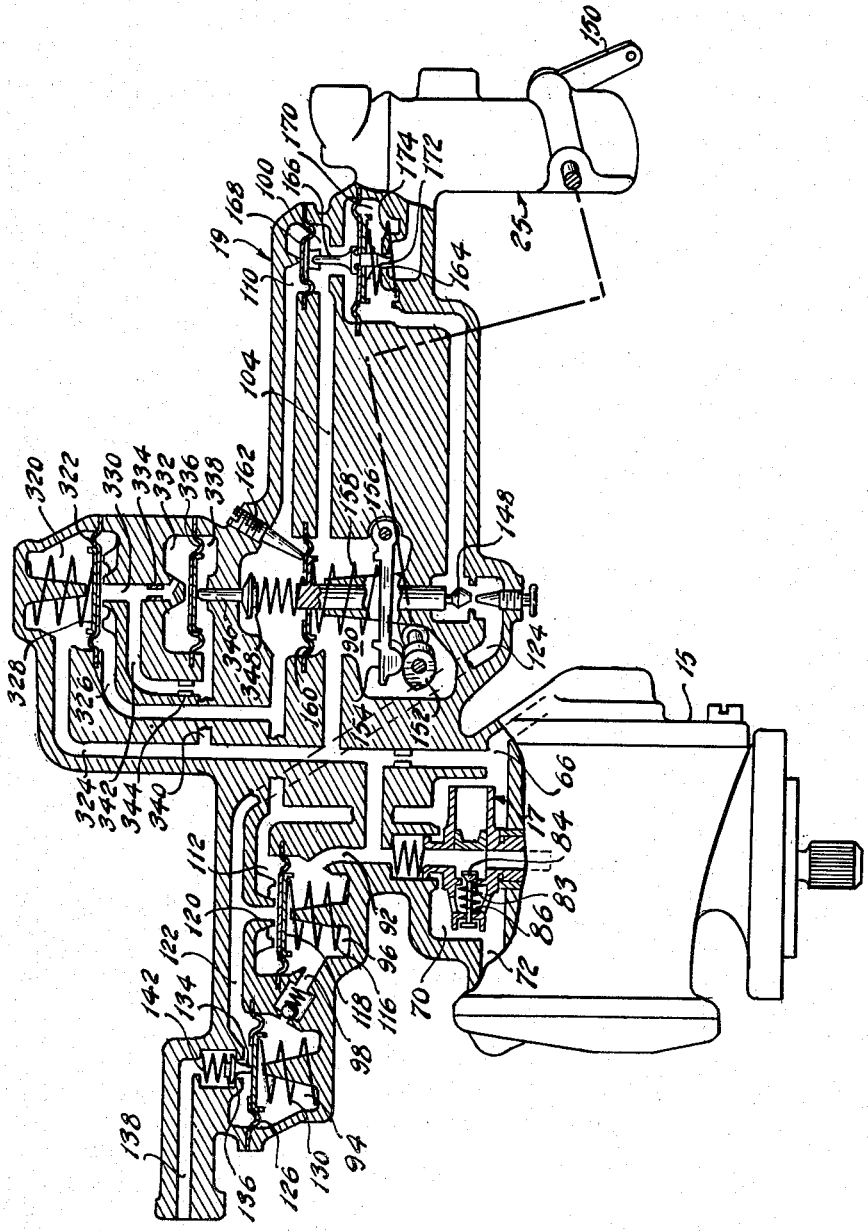
FIGURE 7 illustrates a further modification of the engine fuel control illustrated in FIGURE 1 showing reset means to aid in repositioning the governing valve of the fuel control at the governed speed.

FIGURE 7 illustrates another modification of the invention wherein means are provided for assisting in the resetting of the governor metering valve 148 and thereby creating a more isochronous governing characteristic.

The governor reset apparatus is comprised generally of a first chamber 320 containing a spring biased diaphragm member 322, the opposite sides of which are exposed to pressures $P_2$ and $P_1$ as by means of conduits 324 and 326, respectively. The diaphragm 322 also has a valving member 328 associated therewith for controlling the flow from conduit 326 to conduit 330 which communicates with chamber 332. A restriction 334 contained within conduit 330 is provided primarily as a damping device.

Diaphragm 336, which forms one wall of chamber 332, has its opposite side exposed to pressure $P_2$ as communicated to chamber 338 by means of conduit 340. An additional conduit 342, containing a restriction 344 therein, communicates between conduits 330 and 340.

In operation when engine load is reduced causing engine speed to increase, the change in pressure differential between pressures $P_1$ and $P_2$ causes diaphragm 322 and valve 328 to move upwardly thereby allowing a greater flow through conduit 330. Consequently, the pressure in chamber 332 is increased, because of restriction 344, causing diaphragm 336 to move downwardly against the resiliently biased abutment member 346. As the member 346 so moves, spring 348 is compressed to some degree thereby increasing the downward force on diaphragm 160 and governor metering valve 148.

The drawings and the foregoing specification constitute a description of the improved turbine engine fuel control in such full, clear, concise and exact terms as to enable any person skilled in the art to practice the invention, the scope of which is indicated by the appended claims.

What we claim as our invention is:

1. A fuel control for a turbine engine or similar device comprising means for developing pressures having a pressure differential proportional to the speed of the engine including a constant pressure, positive displacement fuel pump for supplying fuel at a constant pressure and a hydraulic speed sensor rotatable at a speed proportional to engine speed positioned in the fuel having the constant pressure supplied by the pump, means for developing a pressure intermediate the first mentioned pressures and a throttle valve operably associated with the pump, speed sensor and means for developing the intermediate pressure and responsive to each of the pressures for metering fuel to the engine in quantities substantially linearly proportional to engine speed during periods of engine acceleration.

2. A fuel control for a turbine engine or similar device comprising means for developing pressures having a pressure differential proportional to the speed of the engine, means for developing a pressure intermediate the first mentioned pressures, a throttle valve responsive to each of the pressures for metering fuel to the engine in quantities substantially linearly proportional to engine speed during periods of engine acceleration and means connected in parallel with the throttle valve for metering igniter fuel to the engine between predetermined engine speeds including a first diaphragm actuated valve responsive to said pressure differential operable to open at a first predetermined engine speed and a second diaphragm actuated valve down-stream of and in series with said first diaphragm actuated valve responsive to said pressure differential to close at a second predetermined engine speed above said first predetermined engine speed.

3. Structure as claimed in claim 2 and further including means for regulating the pressure at which igniter fuel is metered comprising a spring biased diaphragm actuated constant pressure valve located down-stream of the second diaphragm actuated valve.

4. A fuel control for a turbine engine or similar device comprising means for developing pressures having a pressure differential proportional to the speed of the engine, means for developing a pressure intermediate the first mentioned pressures, a throttle valve responsive to each of the pressures for metering fuel to the engine in quantities substantially linearly proportional to engine speed during periods of engine acceleration and a governor valve responsive to the pressure differential and operably associated with the throttle valve to maintain the engine speed below a predetermined value comprising a valve seat up-stream from the throttle valve, a diaphragm carried needle valve cooperable with said valve seat to restrict the flow of fuel to the throttle valve, the opposite surfaces of said diaphragm being exposed to the said pressures whereby said pressure differential is felt thereacross, resilient means for biasing said diaphragm in a direction to move the needle valve away from the valve seat, and means for varying the force exerted on the needle valve by the resilient means in accordance with manual engine parameter demands.

5. Structure as claimed in claim 4 and further including diaphragm controlled hydraulic actuated governor valve reset means responsive to engine load to aid in the positioning of the governor valve whereby the isochronous properties of fuel control are increased.

6. A fuel control for a turbine engine or similar device comprising means for developing pressures having a pressure differential proportional to the speed of the engine, a throttle valve responsive to the pressure differential for metering fuel to the engine in quantities substantially linearly proportional to engine speed during periods of engine acceleration, and an emergency fuel cut-off valve positioned in the throttle valve fuel flow path for reducing the quantity of fuel metered to the engine from the throttle valve to that necessary to prevent engine flame-out located down-stream of said throttle valve and including a first valved passage for passing all of the fuel metered through the throttle valve to the engine and a second valve passage for passing only sufficient fuel metered through the throttle valve to the engine to prevent flame-out of the engine, resiliently biased means operable to open the first valve passage during engine operation at speeds below a predetermined speed and pressure responsive means operable to close the first valved passage and open the second valved passage during engine operation at speeds above the predetermined engine speed.

References Cited by the Examiner
UNITED STATES PATENTS

| | | | |
|---|---|---|---|
| 2,516,910 | 8/50 | Redding | 60—39.51 |
| 2,649,686 | 8/53 | Lawrence | 60—39.28 |
| 2,660,233 | 11/53 | Carey | 60—39.14 |
| 2,705,047 | 3/55 | Williams | 60—39.28 |
| 2,740,418 | 4/56 | Pankratz | 137—630 |
| 2,939,280 | 6/60 | Farkas | 60—39.28 |
| 2,971,339 | 2/61 | Gold | 60—39.28 |
| 2,981,271 | 4/61 | Cowles | 60—39.28 |
| 3,040,529 | 6/62 | Hurtle | 60—39.28 |
| 3,076,311 | 2/63 | Johnson | 60—39.28 |
| 3,106,934 | 10/63 | Rogers | 60—39.28 |
| 3,118,491 | 2/64 | Simons | 60—39.28 |

SAMUEL LEVINE, *Primary Examiner.*

ABRAM BLUM, *Examiner.*